(12) United States Patent
Lee et al.

(10) Patent No.: US 10,363,878 B1
(45) Date of Patent: Jul. 30, 2019

(54) COLLAPSIBLE STORAGE COMPARTMENT WITH INVERTING HINGE FOR USE IN A VEHICLE

(71) Applicant: GM Global Technology Operations LLC, Detroit, MI (US)

(72) Inventors: Toure Lee, Pontiac, MI (US); Lorin A. Mazur, Shelby Township, MI (US); William D. Gaw, Jr., Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 10 days.

(21) Appl. No.: 15/886,306

(22) Filed: Feb. 1, 2018

(51) Int. Cl.
| B60R 7/00 | (2006.01) |
| B60R 7/04 | (2006.01) |
| B60R 5/04 | (2006.01) |
| B60R 7/08 | (2006.01) |
| B60R 11/00 | (2006.01) |

(52) U.S. Cl.
CPC .............. B60R 7/046 (2013.01); B60R 5/045 (2013.01); B60R 7/005 (2013.01); B60R 7/08 (2013.01); *B60R 2011/0042* (2013.01)

(58) Field of Classification Search
CPC .......... B60N 3/10; B60R 7/046; B60R 7/005; B60R 5/045; B60R 7/08; B60R 2011/0042
USPC ..................................................... 296/37.13
See application file for complete search history.

(56) References Cited

U.S. PATENT DOCUMENTS

| 1,642,161 A * | 9/1927 | Lester ...................... B60R 7/04 206/90 |
| 1,815,028 A * | 7/1931 | Burch ..................... B60R 7/005 224/277 |
| 1,995,143 A * | 3/1935 | Burch ..................... B60R 7/005 2/252 |
| 3,730,581 A * | 5/1973 | Parkinson ............... B60R 7/046 2/247 |
| 4,522,442 A * | 6/1985 | Takenaka ................. B62J 17/02 180/215 |
| 4,619,477 A * | 10/1986 | Kneib ..................... B60R 7/046 296/152 |
| 4,712,823 A * | 12/1987 | Mills ........................ B60N 3/18 296/152 |
| 5,261,716 A * | 11/1993 | Phelps .................... B60R 7/046 296/152 |
| 5,372,289 A * | 12/1994 | Dachicourt ............... B60R 7/02 224/281 |
| 5,535,571 A * | 7/1996 | Nichols .................. B29C 33/48 296/152 |
| 5,795,005 A * | 8/1998 | Garfias .................. B60R 7/046 220/9.2 |

(Continued)

Primary Examiner — Pinel E Romain (57) ABSTRACT

A collapsible storage compartment includes an inner bin with an inner side wall and an inner base wall. The inner side wall is connected to a periphery of the inner base wall to define a cavity. The collapsible storage compartment further includes an outer bin connected to the inner bin. The outer bin includes an outer base wall and a flexible hinge. The flexible hinge is movably connected to the outer base wall and is configured to move the outer base wall between a stowed position and a deployed position, wherein at least a portion of the hinge flexes into the cavity to move the outer base wall toward the inner base wall when the outer base wall is moved from the deployed position to the stowed position.

20 Claims, 6 Drawing Sheets

(56) References Cited

U.S. PATENT DOCUMENTS

| | | | | |
|---|---|---|---|---|
| 5,800,004 | A * | 9/1998 | Ackeret | B60R 7/046 224/915 |
| 6,109,493 | A * | 8/2000 | Bieri | B60R 7/06 224/281 |
| 6,196,605 | B1 * | 3/2001 | Baldas | B60R 7/046 224/543 |
| 7,249,795 | B1 * | 7/2007 | Kellerman | A61G 21/00 296/16 |
| 7,328,825 | B2 * | 2/2008 | Kaiser | B60R 7/046 220/8 |
| 7,371,341 | B2 * | 5/2008 | Youngs | B29C 45/0017 264/238 |
| 7,654,402 | B2 | 2/2010 | Kusuma et al. | |
| 7,775,613 | B2 * | 8/2010 | Williams | A47B 46/005 312/248 |
| 8,210,590 | B1 * | 7/2012 | Moberg | B60J 5/042 224/544 |
| 8,505,794 | B2 * | 8/2013 | Ardigo | B60R 7/08 224/543 |
| 8,701,951 | B2 * | 4/2014 | Lucas | H01R 13/60 224/416 |
| 8,807,408 | B2 * | 8/2014 | Kreis | B60N 3/108 224/539 |
| 9,114,839 | B2 * | 8/2015 | Langenbacher | B60N 3/101 |
| 9,211,848 | B2 * | 12/2015 | Murray | B60R 7/04 |
| 9,238,440 | B1 * | 1/2016 | Bowser | B60R 7/084 |
| 9,421,916 | B1 * | 8/2016 | Dyle | B60R 7/04 |
| 9,618,026 | B2 | 4/2017 | Morris et al. | |
| 9,682,664 | B2 * | 6/2017 | Bettzuege | B60R 11/0252 |
| 10,195,925 | B2 * | 2/2019 | Thomas | E05B 83/28 |
| 10,202,024 | B2 * | 2/2019 | Rao | B60R 13/0243 |
| 2004/0206765 | A1 | 10/2004 | McMahon et al. | |
| 2013/0277364 | A1 | 10/2013 | Kusuma et al. | |
| 2017/0291554 | A1 * | 10/2017 | Perez Astudillo | B60R 5/048 |

* cited by examiner

COLLAPSIBLE STORAGE COMPARTMENT WITH INVERTING HINGE FOR USE IN A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to collapsible storage compartments with inverting hinges for use in vehicles.

Vehicles and other modes of transportation often include storage compartments. Occupants of the vehicles or other modes of transportation use the storage compartments to store various items. Such items can include beverages, food, maps, documents, books, purses, wallets, ice scrapers, tools, laptops, tablets, personal care items, mobile communication devices, and the like. These items have various sizes and shapes.

To accommodate the storage needs of occupants, storage compartments can be positioned in various locations. Storage compartments can be positioned in center consoles, on seats, on doors or on other support structures. The storage compartments can have various sizes or shapes to accommodate the various sizes and shapes of items to be stored.

SUMMARY

In one example in accordance with the present disclosure, a collapsible storage compartment includes an inner bin with an inner side wall and an inner base wall. The inner side wall is connected to a periphery of the inner base wall to define a cavity. The collapsible storage compartment further includes an outer bin connected to the inner bin. The outer bin includes an outer base wall and a flexible hinge. The flexible hinge is movably connected to the outer base wall and is configured to move the outer base wall between a stowed position and a deployed position, wherein at least a portion of the hinge flexes into the cavity to move the outer base wall toward the inner base wall when the outer base wall is moved from the deployed position to the stowed position.

In one aspect, the outer bin is removably connected to the inner bin.

In one aspect, the outer bin is connected to the inner bin along a portion of the inner side wall of the inner bin to define an access opening to permit access to the cavity when the outer base wall is in the deployed position and in the stowed position.

In one aspect, a vertical height of the outer base wall is less than a vertical height of the inner base wall such that the outer bin permits access to the cavity when the outer base wall is in the deployed position and in the stowed position.

In one aspect, the hinge is integrally formed with the outer base wall.

In one aspect, the hinge is made of a first material and the outer base wall is made of a second material wherein the first material is different from the second material.

In one aspect, the hinge includes an outer side wall and one or more flex regions. The one or more flex regions has a thickness that is less than a thickness of the outer side wall such that the hinge flexes at the flex regions to cause the outer side wall to rotate about the one or more flex regions.

In one aspect, the outer side wall is made of a material having a first durometer and the one or more flex regions are made of the same material as the outer side wall but have a second durometer wherein the first durometer is different from the second durometer.

In one aspect, the hinge includes at least a first flex region and a second flex region and the outer side wall is positioned between the first flex region and the second flex region.

In one aspect, the outer bin includes an attachment collar. The attachment collar is connected to a side of the hinge opposite to the outer base wall and the attachment collar is positioned adjacent to the inner bin and connects the outer bin to the inner bin.

In one aspect, the inner bin includes a saddle portion. The saddle portion is positioned along a portion of an outer edge of the inner side wall and is configured to receive the attachment collar to connect the outer bin to the inner bin.

In one aspect, the saddle portion includes a connecting wall facing the attachment collar wherein the connecting wall includes a plurality of apertures. The attachment collar includes a plurality of locking tabs projecting outward from the attachment collar wherein the plurality of locking tabs are configured to be received in the plurality of apertures to connect the outer bin to the inner bin.

In one aspect, the locking tabs each include a curved projection with a finger. The curved projections of the locking tabs project through the apertures and the fingers engage edges of the apertures to removably connect the outer bin to the inner bin.

In one aspect, the connecting wall and the attachment collar are oriented perpendicular to the inner side wall of the inner bin such that the plurality of locking tabs are positioned perpendicular to the inner side wall when inserted through the plurality of apertures.

In one aspect, the connecting wall is positioned in a connecting plane that is inset from an outer edge of the inner side wall such that the attachment collar is positioned between inner base wall and the outer edge of the inner side wall.

In one aspect, the outer base wall is positioned outside of the cavity when in the deployed position and inside the cavity when in the stowed position.

In one aspect, the outer base wall includes a first edge, a second edge, a third edge and a fourth edge. The hinge is connected to the outer base wall along the first edge, the second edge and the third edge. The fourth edge is free floating relative to the inner bin to permit access to the cavity when the outer base wall is in the deployed position and in the stowed position.

In one aspect, the inner bin includes a plurality of connection points projecting outward from the inner side wall. The plurality of connection points are configured for connecting the inner bin to a support surface oriented parallel to the inner base wall.

In one aspect, the support surface is located on a door trim panel of a vehicle.

In another example in accordance with the present disclosure, a collapsible storage compartment is configured for use in a door trim panel of a vehicle. The example collapsible storage compartment includes a rigid inner bin including an inner side wall and an inner base wall. The inner side wall is connected around a periphery of the inner base wall. The inner side wall includes a plurality of connection points and a saddle portion. The plurality of connection points project outward from the inner side wall to connect the inner bin to the door trim panel and the saddle portion is inset from an outer edge of the inner side wall and extends upward from a bottom of the inner side wall. The example collapsible storage compartment also includes an outer bin including a flexible hinge, a rigid outer base wall and an attachment collar. The flexible hinge is connected to a first edge, a second edge and a third edge of the outer base wall. A fourth edge of the outer base wall is free floating and spaced apart from the inner bin to permit access to an interior of the storage compartment. The flexible hinge is connected to and positioned between the rigid outer base wall and the attachment collar. The attachment collar is received into the saddle portion to connect the outer bin to the inner bin. The flexible hinge includes one or more flex points to permit the hinge to flex inward and toward the inner base wall causing the outer base wall to move toward the inner base wall when the outer base wall is moved from a deployed position to a stowed position, wherein the outer base wall has a height that is less than a height of the inner base wall to define an access opening to permit access to a storage volume located between the inner base wall and the outer base wall.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In one example in accordance with the present disclosure, a collapsible storage compartment includes an outer bin that is removably connected to an inner bin. The outer bin and the inner bin combine to define a storage volume that can be increased by moving an outer base wall of the outer bin from a stowed position to a deployed position. The outer bin includes a flexible hinge that is connected between the inner bin and the outer base wall of the outer bin to permit the outer base wall to move relative to the inner bin to increase the storage volume of the collapsible storage compartment.

In such an example collapsible storage compartment, the flexible hinge includes an outer side wall and two or more flex points. The outer side wall is positioned between two such flex points such that the outer side wall can rotate about the flex points to move the outer base wall toward or away from the inner base wall.

In one example, the outer side wall of the flexible hinge rotates inwardly toward the inner base wall and into the inner bin when the outer side wall moves from the deployed position to the stowed position. Such movement of the outer side wall of the flexible hinge can cause contents that may be positioned in the storage compartment to be moved toward the outer side wall in a manner that does not pinch or trap such contents in the storage compartment. In one example, the flexible hinge is configured to invert or rotate into the inner bin such that the outer base wall is positioned flushly or inside the inner bin when the outer base wall is moved to the stowed position. In this manner, the outer bin and/or the outer base wall do not project outward beyond the outer profile of the inner bin.

The example collapsible storage compartments of the present disclosure can be used in the interior cabins of vehicles. For example, the collapsible storage compartments can be mounted in the door trim of a vehicle. The outer bin can be stowed flushly with or inside the door trim and then moved to the deployed position to increase the storage volume of the storage compartment. As can be appreciated, the collapsible storage compartment of the present disclosure can be used in other environments or other applications such as in various personal, public, commercial or industrial vehicles, in marine environments, in furniture or the like.

Figure 1:
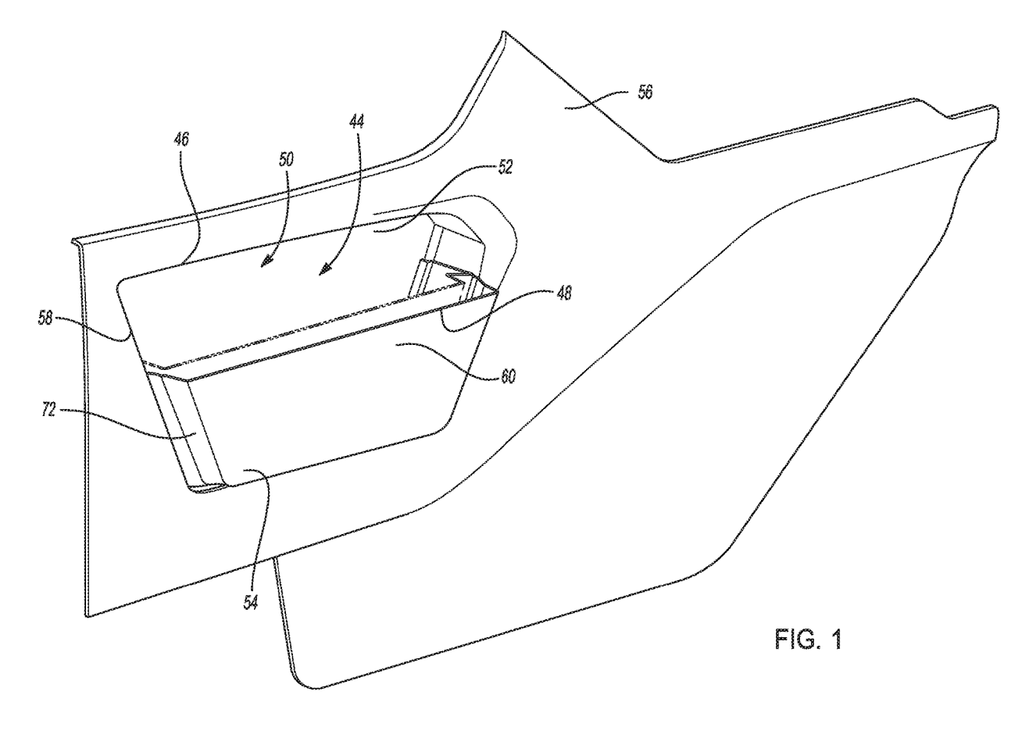
FIG. 1 is a perspective view of an example collapsible storage compartment in accordance with the present disclosure shown in a door trim panel.

Referring now to FIG. 1, an example collapsible storage compartment 50 includes an inner bin 52 and an outer bin 54. As shown, the storage compartment 50 can be mounted in a door trim panel 56 of a vehicle. In such an example application, the inner bin 52 is mounted to a back side of the door trim panel 56 at an opening 58. The outer bin 54 is connected to the inner bin 52 at the opening 58 so that the outer bin 54 projects through the opening 58 when the outer bin 54 is in the deployed position. As shown in the dashed lines, the outer bin 54 can be moved to a stowed position in which an outer base wall 60 of the outer bin 54 moves toward the inner bin 52. In the stowed position, the outer base wall 60 can be positioned flushly with the door trim panel 56 or inside the inner bin 52. In such a stowed position, the outer bin 54 does not project outward from the door trim panel 56.

In the example shown, the outer bin 54 does not completely cover the inner bin 52. The upper edge 46 of the inner bin 52 and the upper edge 48 of the outer bin 54 are spaced apart from each other to define an access opening 44. The access opening 44 permits objects to be inserted (or removed) from the storage compartment 50 when the outer bin 54 is in either the deployed position or in the stowed position.

In the example shown, the inner bin 52 and the outer bin 54 have a similar outer profile. The inner bin 52 and the outer bin 54 have a trapezoidal shape. In other examples, the inner bin 52 and/or the outer bin 54 can have other shapes such as rectangular, circular, oval or other suitable shapes. In addition, the inner bin 52 and/or the outer bin 54 can have formations that are suitable to hold or retain objects that may be stored in the storage compartment 50. For example, the inner bin 52 and/or the outer bin 54 can have suitable formations to hold beverage containers, maps, sunglasses, tools, documents, electronic devices or other items.

Figures 2, 3:
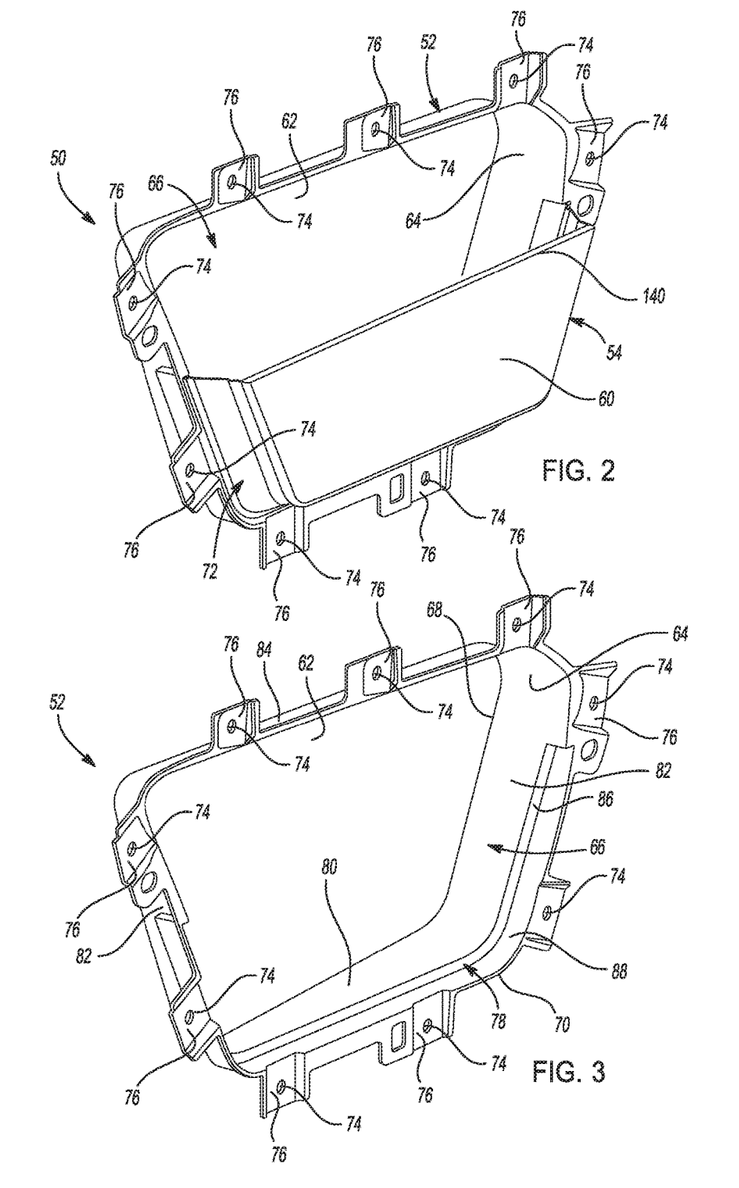
FIG. 2 is a perspective view of another example collapsible storage compartment in accordance with the present disclosure.
FIG. 3 is a perspective view of an inner bin of the example collapsible storage compartment of FIG. 2.
Figure 4:
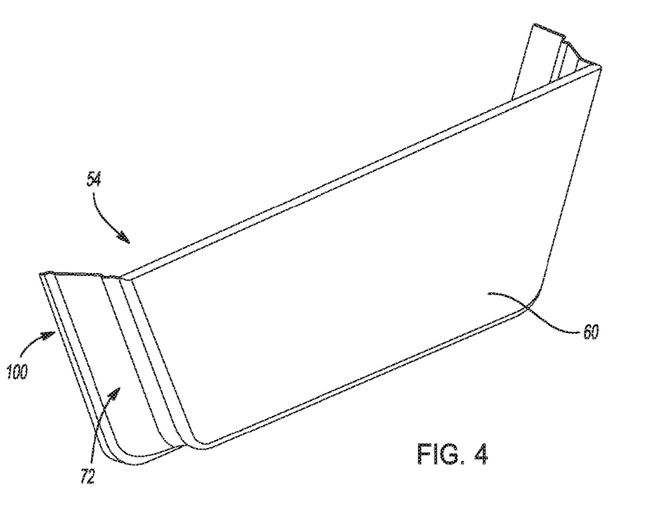
FIG. 4 is a perspective view of an outer bin of the example collapsible storage compartment of FIG. 2.

Referring now to FIGS. 2 to 4, the example storage compartment 50 is shown apart from the door trim panel 56. The inner bin 52 includes an inner base wall 62 and an inner side wall 64. The inner side wall 64 is connected to the inner base wall 62 to define an inner cavity 66. The inner side wall 64 wraps around a periphery of the inner base wall 62. The inner side wall 64 is connected to the inner base wall at an inner edge 68 of the inner side wall 64. The outer edge 70 of the inner side wall 64 is positioned on a side opposite to the inner edge 68. The inner bin 52 is connected to a supporting surface (e.g., the door trim panel 56) at or near the outer edge 70. As shown, the inner side wall 64 is a rounded continuous wall that extends around the periphery of the inner base wall 62. In other examples, the inner side wall 64 can be separated into discrete panels that are joined together or the inner side wall 64 can have corners that define one or more panels that together create the inner side wall 64.

Figure 5:
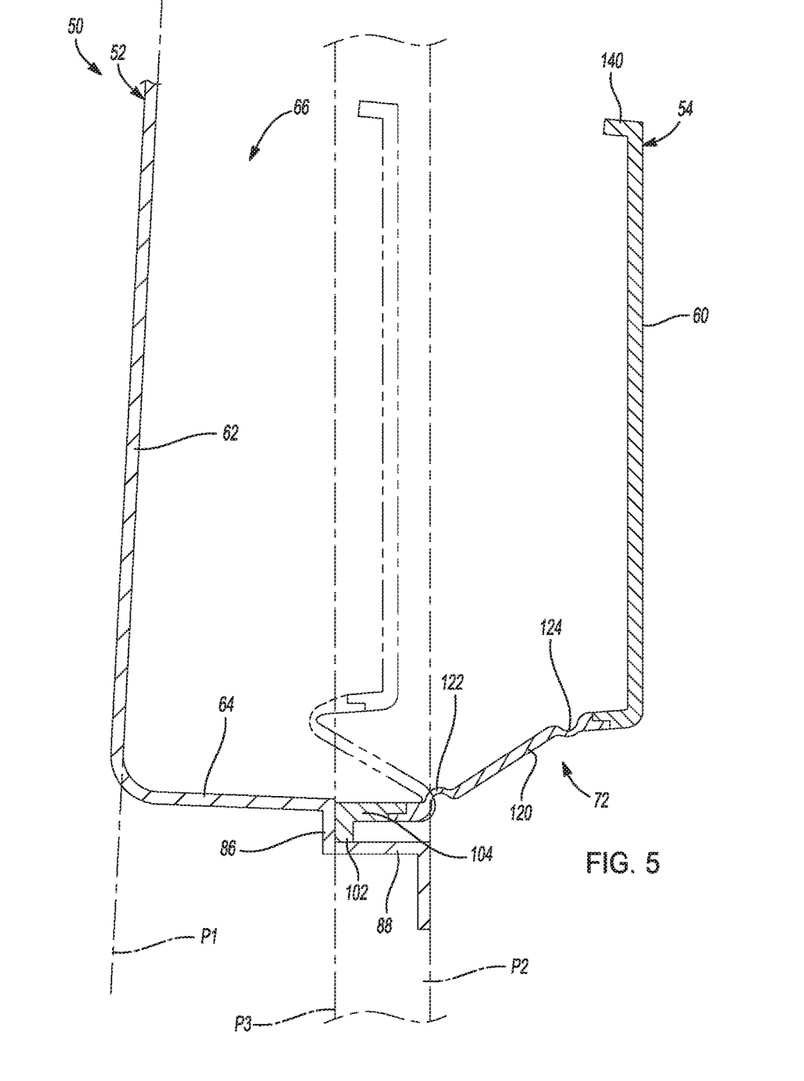
FIG. 5 is a cross-sectional view of the example collapsible storage compartment of FIG. 2 showing the outer bin in a deployed position and in a stowed position.

As previously stated, the inner side wall 64 and the inner base wall 62 define the inner cavity 66. The inner cavity 66 is a volume of space inside the inner bin 52 in which items can be stored. As shown in FIG. 5, the inner cavity 66 has a depth that can be measured as the perpendicular distance between a first plane P1 defined by inner base wall 62 and a second plane P2 defined by the outer edge 70. The depth of the inner cavity 66 can have any suitable dimension. In the example shown, the depth of the inner cavity 66 is sufficient to permit items to be stored inside the inner cavity 66 and to permit the outer bin 54 to be moved to a stowed position in which the outer base wall 60 and/or the hinge 72 to be positioned inside the inner cavity 66 (i.e., between the first plane P1 and the second plane P2).

As further shown in the storage compartment 50, the inner bin 52 includes a plurality of connecting points 74 positioned on one or more attachment tabs 76. The attachment tabs 76, in this example, are rectangular shaped projections that extend away from the outer edge 70 of the inner side wall 64. The connecting points 74 are openings that are positioned in each attachment tab 76. A fastener (not shown) can be inserted through the connecting points 74 to secure the inner bin 52 to a support surface such as the door trim panel 56. The attachment tabs 76 can include stiffening features such as ribs, fillets, darts or the like to strengthen the attachment tabs 76 and to limit the deflection of the attachment tabs 76 when the storage compartment is subjected to external forces.

As shown in FIG. 3, the inner bin 52 includes a saddle portion 78. The outer bin 54 connects to the inner bin 52 at the saddle portion 78. The saddle portion 78, in this example, is an inset feature of the inner bin 52 that extends across a bottom 80 of the inner side wall 64 and extends upward along the upstanding portions 82 of the inner side wall 64. The saddle portion 78 does not continue along the entire length of the upstanding portions 82. Instead, the saddle portion 78 terminates below the top 84 of the inner side wall 64. As will be further explained, the saddle portion 78 terminates below the top 84 so that the outer bin 54 does not completely cover the inner cavity 66 and permits a user to access the inner cavity 66 to insert or remove items from the inner cavity 66.

The saddle portion 78, in the example shown, includes a connecting wall 86 and an insertion wall 88. The connecting wall 86 is oriented parallel to and inset from the second plane P2 defined by the outer edge 70 of the inner side wall 64. The connecting wall 86 is connected to the insertion wall 88. The insertion wall 88 is oriented parallel to the inner side wall 64. In this manner, the connecting wall 86 defines a connecting plane P3 in the inner bin 52 which the outer bin 54 can be attached. Since the connecting wall 86 is inset from the outer edge 70 of the inner side wall 64, the outer bin 54 is connected to the inner bin 52 at a location that is inset as well. As will be further explained, this permits all or a portion of the outer bin 54 to be positioned inside the inner cavity 66 when the outer bin is moved from the deployed position to the stowed position.

As shown in FIGS. 2 and 4, the outer bin 54 is connected to the inner bin 52 at the saddle portion 78. The outer bin 54 includes the outer base wall 60, the hinge 72 and an attachment collar 100. The outer base wall 60 is a planar member and has a trapezoidal shape as previously described. The hinge 72 is connected to the perimeter of the outer base wall 60. As will be further described, the hinge 72 is flexible such that the hinge 72 can permit the movement of the outer base wall 60 relative to the inner bin 52 between the stowed position and the deployed position. The attachment collar 100 is connected to the hinge 72. The attachment collar 100 connects the outer bin 54 to the inner bin 52.

The attachment collar 100, in the example shown, includes a foot 102 and an extension 104. The extension 104 projects inward toward the inner base wall 62 when the attachment collar 100 is seated inside the saddle portion 78. The foot 102 abuts the connecting wall 86 at the connecting plane P3 to connect the outer bin 54 to the inner bin 52. Various attachments can be used to connect the foot 102 to the connecting wall 86 to secure the attachment collar 100 to the saddle portion 78. Adhesive, welds, stakes, fasteners, tabs, clips and the like can be used to secure the attachment collar 100 to the saddle portion 78.

Figure 7:
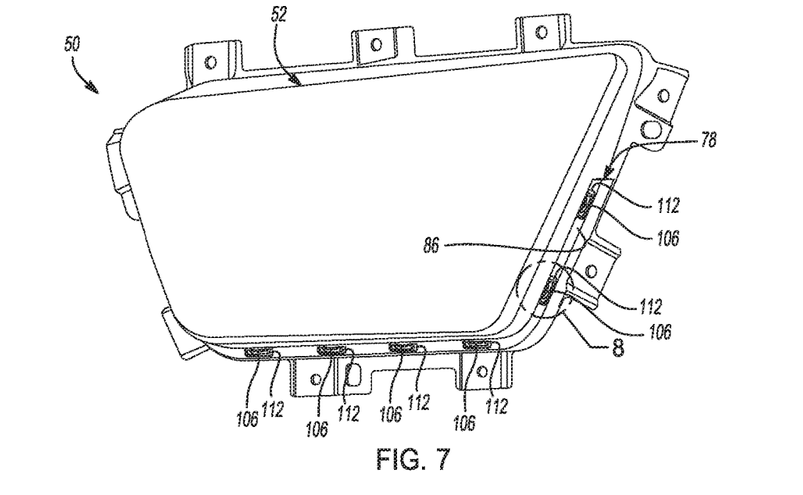
FIG. 7 is a rear perspective view of the example collapsible storage compartment of FIG. 2 showing locking tabs connecting the outer bin to the inner bin.
Figure 8:
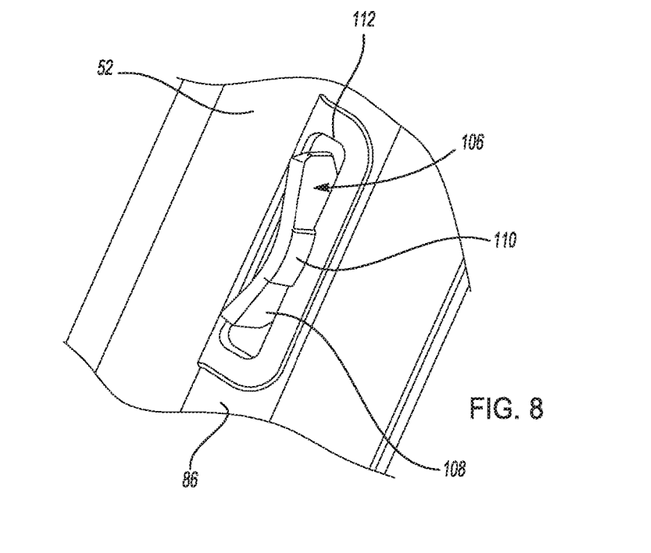
FIG. 8 is a magnified view of one of the locking tabs of the example collapsible storage compartment as indicated in FIG. 7.

In one example, as shown in FIGS. 7 and 8, the attachment collar 100 includes a plurality of locking tabs 106 that project outward from the foot 102 of the attachment collar 100. The locking tabs 106, in this example, include a curved projection 108 and a finger 110. The locking tabs 106 interface with corresponding apertures 112 located in the connecting wall 86 of the inner bin 52. As shown, the locking tabs 106 are inserted through the apertures 112. The curved projections 108 abut the edges of the apertures 112 to locate the attachment collar 100 relative to the inner bin 52. The fingers 110 are raised angular features that project outward from the curved projections 108. The fingers 110 engage the edges of the apertures 112 to lock the locking tabs 106 in the apertures 112 and resist the movement of attachment collar 100 that would disengage the outer bin 54 from the inner bin 52.

As shown in this example, the attachment collar 100 and the corresponding connecting wall 86 include a plurality of the locking tabs 106 and the apertures 112, respectively. The outer bin 54 is located in a desired position relative to the inner bin 52 through the use of elastic averaging across the plurality of locking tabs 106 and the apertures 112. Such use of the elastic averaging for locating the outer bin 54 relative to the inner bin 52 eliminates the need to include separate locator features on the outer bin 54 and/or the inner bin 52 such as a 2-way or 4-way locator.

As shown in FIG. 8, the curved projections 108 are sized relative to the apertures 112 to permit the curved projections 108 to elastically deform when the curved projections 108 are inserted into the apertures 112. As the outer bin 54 is mated to the inner bin 52, the curved projections 108 are inserted through the apertures 112. During this mating process, a point is reached where a curved projection 108 abuts an edge of an aperture 112 such that the curved projection 108 elastically deforms so that the curved projection 108 can be inserted through the aperture 112. This process continues as all the curved projections 108 are inserted through all the apertures 112. The elastic deformation that occurs is elastically averaged over all the curved projections 108 and their corresponding apertures 112. The curved projections 108 and the corresponding apertures 112 are sized appropriately given their geometric variations such that the outer bin 54 is precisely located at the desired position relative to the inner bin 52.

As previously described, the hinge 72 is positioned between the attachment collar 100 and the outer base wall 60. The hinge 72, in one example, includes an outer side wall 120 and one or more flex points. The hinge 72 is flexible and can move in order to translate the outer base wall 60 between the deployed position and the stowed position. As shown in the example of FIG. 5, the hinge 72 includes a first flex point 122 and a second flex point 124. The outer side wall 120 is positioned between the first flex point 122 and the second flex point 124. The first flex point 122 and the second flex point 124, in the example shown, are localized regions of the hinge 72 in which the material thickness is less than the material thickness of surrounding regions such as the material thickness of the outer side wall 120. The reduced thickness of the first flex point 122 and of the second flex point 124 relative to the outer side wall 120 causes the outer side wall 120 to rotate around the first flex point 122 and/or the second flex point 124 when a force is exerted against the outer base wall 60.

To further cause the hinge 72 to move in a desired direction, the first flex point 122 and/or the second flex point 124 has a curved shape. The curved shape can facilitate the rotation of the outer side wall 120 in a certain direction. In the example shown, the first flex point 122 has a curved shape that curves into the inner cavity 66. The second flex point 124 has a curved shape that curves away from the inner cavity 66. These opposing curved shapes of the first flex point 122 and the second flex point 124 cause the outer side wall 120 to rotate in a counter-clockwise direction or in a direction toward the inner cavity 66. In other examples, the first flex point 122 and/or the second flex point 124 can have other shapes or profiles such as v-shapes, u-shapes or can have notches or grooves that can cause similar desired movement of the outer side wall 120.

Figure 6:
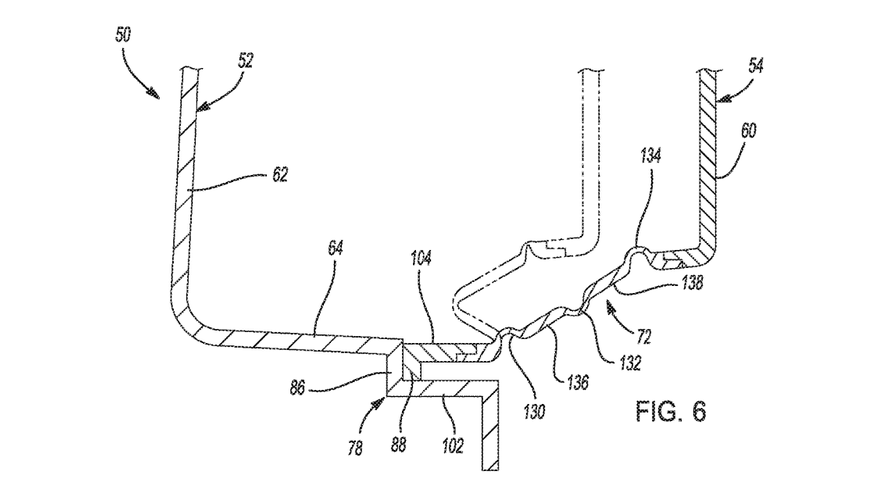
FIG. 6 is a cross-sectional view of another example collapsible storage compartment of the present disclosure showing the outer bin in a deployed position and in a stowed position.

In still other examples, the hinge 72 can include more than two flex points. In one such example, as shown in FIG. 6, the hinge 72 includes a first flex point 130, a second flex point 132 and a third flex point 134. In this example, a first outer side wall 136 is positioned between the first flex point 130 and the second flex point 132 and a second outer side wall 138 is positioned between the second flex point 132 and the third flex point 134. The first flex point 130, the second flex point 132 and the third flex point 134 have material thicknesses that are less than the material thicknesses of the first outer side wall 136 and the second outer side wall 138. In addition, the first flex point 130, the second flex point 132 and the third flex point 134 have curved shapes.

When a force is applied to the outer base wall 60, the first outer side wall 136 rotates about the first flex point 130 and the second flex point 132 to cause the outer base wall 60 to translate inward toward the inner bin 52 to move the outer bin from the deployed position to the stowed position (as shown in dashed lines). In still other examples, the hinge 72 can include other quantities of flex points and other quantities of outer side walls to cause outer base wall 60 to move from the deployed position to the stowed position.

As shown in FIG. 2, the hinge 72 is connected along three sides of the outer base wall 60. The hinge 72 is connected to the outer base wall 60 on a lower side and along the two opposing upwardly directed edges. An upper edge 140 of outer base wall 60 is not directly connected to the inner bin 52. The upper edge 140 is free floating relative to the inner bin 52 in that no structure spans across an access opening 142 that is defined by the upper edge 140 and a portion of the outer edge 70 of the inner side wall 64 that is located above the outer bin 54. The upper edge 140 is free floating so that there is not an impediment to inserting or removing items from the inner cavity 66 when the outer bin 54 is in either the deployed position or the stowed position.

Referring back to the example shown in FIG. 5, when a force is applied to the outer base wall 60 in a direction generally normal to the outer base wall 60 and toward the inner bin 52, the outer base wall 60 can move from the deployed position to the stowed position (as shown in dashed lines in FIG. 5). In the deployed position, the hinge 72 has an angled profile that projects away from the inner bin 52. In this position, the hinge 72 causes the outer base wall 60 to be positioned outward and away from the inner base wall 62 such that the outer base wall 60 is outward of the second plane P2 (i.e., outward from outer edge 70 of the inner side wall 64). In the deployed position, the separation between the second plane P2 and the outer base wall 60 results in an increased storage volume in the storage compartment 50 because there is an additional cavity created in addition to the inner cavity 66 defined by the inner bin 52.

In the deployed position, the outer bin 54 projects outward of a support surface to which the storage compartment is mounted. In the example where the storage compartment 50 is mounted to the door trim panel 56, the outer bin 54 projects into the vehicle cabin. Such a circumstance can be undesirable in that the outer bin 54 can interfere with an occupant's legs or can interfere with or block an occupant from entering or exiting a vehicle. As previously described, the outer bin 54 can be moved from the deployed position to the stowed position in these circumstances.

In the stowed position (as shown in the dashed lines in FIG. 5), the hinge 72 has rotated inward toward the inner base wall 62 and caused the outer base wall 60 to translate inward into the inner cavity 66. In the example shown, the outer base wall 60 is positioned between the first plane P1 and the second plane P2 such that the outer base wall 60 does not project outward from the inner bin 52.

During the movement of the outer bin 54 from the deployed position to the stowed position, at least a portion of the hinge 72 moves toward the inner base wall 62 and into the inner cavity 66. In the example shown in FIG. 5, the outer side wall 120 and the second flex point 124 rotate in a counter clockwise direction into the inner cavity 66. In addition to moving the outer base wall 60 toward the inner base wall 62, this movement of the hinge 72 also can move items that are stored in the storage compartment 50 toward the inner base wall 62. For example, if an item is contained in the storage compartment 50 when the outer bin 54 is in the deployed position, the item would be pushed toward the inner base wall 62 by the outer base wall 60 and/or the second flex point 124 when the outer bin 54 moves to the stowed position. The structure of the hinge 72 does not create a vertically oriented pocket or other pinch point that can be otherwise created using a traditional accordion-type or corrugated structure. As such, the hinge 72 of the present disclosure does not bind or prevent the removal of items that may be stored in the storage compartment 50 after the outer bin 54 has been moved from the deployed position to the stowed position.

The storage compartment 50 can be made of any suitable material. In the example shown, the storage compartment 50 is made of multiple materials with varying degrees of flexibility. The inner bin 52, in one example, is made of a relatively rigid material. Such a rigid material is capable of withstanding normal loads without significant deformation that may be exerted during the storage of typical items that are inserted or removed from a storage compartment in a door trim panel of a vehicle. The inner bin 52 can be made from a suitable plastic material such as thermoplastic polymer such as Acrylonitrile Butadiene Styrene (ABS) or from a thermoplastic elastomer (TPE). In other examples, the inner bin 52 can be made of other suitable materials.

The outer bin 54 can also be made from a variety of materials. In one example, the outer bin 54 is made of a suitable thermoplastic elastomer (TPE) having variable durometers. In such examples, portions of the outer bin 54 are relatively more rigid than other portions of the outer bin 54. For example, the attachment collar 100 and the outer base wall 60 can be made of relatively rigid material and the hinge 72 can be made of relatively flexible material. Such a structure is possible by creating the outer bin 54 via a two-shot molding process or by printing the outer bin 54 (via 3D printing techniques) using two different durometer materials. In such examples, the outer bin 54 is a single integrated part wherein the attachment collar 100, the hinge 72 and the outer base wall 60 are formed as a single integrated part. This can reduce complexity during assembly as well as reduce the weight of the outer bin 54.

Figure 9:
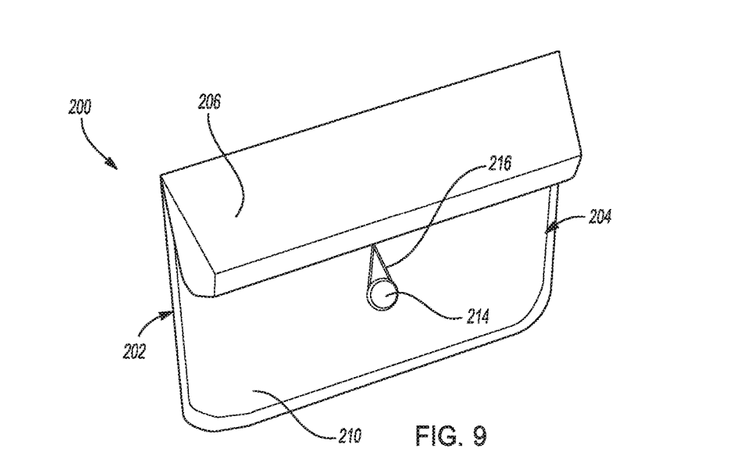
FIG. 9 is a perspective view of an example covered collapsible storage compartment in accordance with the present disclosure.
Figure 10:
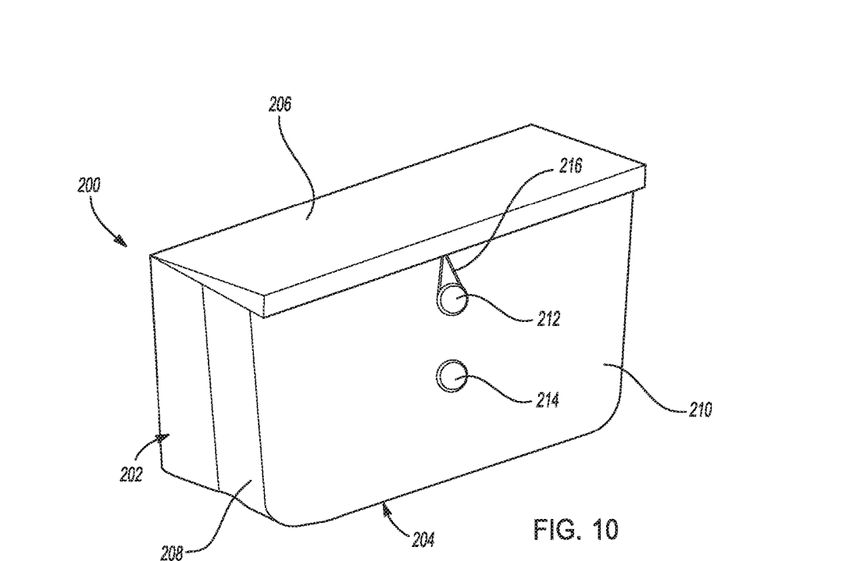
FIG. 10 is a perspective view of the example covered collapsible storage compartment of FIG. 9 shown in the deployed position.

Referring now to FIGS. 9 and 10, another example storage compartment 200 includes an inner bin 202, an outer bin 204 and a lid 206. The storage compartment 200, in the example shown, can include one or more aspects of the previously described storage compartment 50. For example, the outer bin 204 of the storage compartment 200 can move from a stowed position (FIG. 9) to a deployed position (FIG. 10). The outer bin 204 is connected to the inner bin 202. The outer bin 204 moves away from the inner bin 202 when the outer bin 204 is moved from the stowed position to the deployed position. In this manner, the storage compartment 200 can have an increased storage volume when in the deployed position.

The outer bin 204, in this example, includes a flexible hinge 208. While not shown, the hinge 208 can include one or more of the aspects of the hinge 72 previously discussed to cause the hinge 208 to move an outer base wall 210 of the outer bin 204 relative to the inner bin 202.

The lid 206, in this example, is connected to the inner bin 202 and is positioned on top of the storage compartment 200 to cover an access opening (not shown) of the storage compartment 200. The outer base wall 210 includes a first retention post 212 and a second retention post 214. The first retention post 212 is positioned above the second retention post 214 on the outer base wall 210. The first retention post 212 and the second retention post 214 are circular projections in this example. In other examples, the first retention post 212 and/or the second retention post 214 can have other shapes or sizes.

The lid 206, in this example, includes a tether 216 that is connected to a forward portion of the lid 206. The tether 216 removably connects to either the first retention post 212 or the second retention post 214 to secure the lid 206 in a closed position to cover the storage compartment 200. The tether 216, in this example, is a loop of material. In other examples, other hooks, clips and other retention features can be used to removably secure the lid 206 in a closed position.

As shown, the lid 206 can be secured in the closed position when the outer bin 204 is in the stowed position (FIG. 9) by connecting the tether 216 to the second retention post 214. When the outer bin 204 is in the deployed position (FIG. 10), the lid 206 can be secured in the closed position by connecting the tether 216 to the first retention post 212. The stacked orientation of the first retention post 212 and the second retention post 214 permits the lid to be secured in a closed position when the outer bin 204 is in either the stowed position or in the deployed position.

The covered collapsible storage compartment 200 can be used in environments where the storage compartment 200 may be exposed to weather, contaminants or other elements. Example applications for the covered collapsible storage compartment 200 include bicycles, motorcycles, boats and the like.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A collapsible storage compartment comprising:
an inner bin including an inner side wall and an inner base wall, the inner side wall connected to a periphery of the inner base wall to define a cavity;

an outer bin connected to the inner bin, the outer bin including an outer base wall and a flexible hinge, the flexible hinge movably connected to the outer base wall and configured to move the outer base wall between a stowed position and a deployed position; and wherein at least a portion of the hinge flexes into the cavity to move the outer base wall toward the inner base wall when the outer base wall is moved from the deployed position to the stowed position.

2. The collapsible storage compartment of claim 1 wherein the outer bin is removably connected to the inner bin.

3. The collapsible storage compartment of claim 1 wherein the outer bin is connected to the inner bin along a portion of the inner side wall of the inner bin to define an access opening to permit access to the cavity when the outer base wall is in the deployed position and in the stowed position.

4. The collapsible storage compartment of claim 1 wherein a vertical height of the outer base wall is less than a vertical height of the inner base wall such that the outer bin permits access to the cavity when the outer base wall is in the deployed position and in the stowed position.

5. The collapsible storage compartment of claim 1 wherein the hinge is integrally formed with the outer base wall.

6. The collapsible storage compartment of claim 1 wherein the hinge is made of a first material and the outer base wall is made of a second material, the first material different from the second material.

7. The collapsible storage compartment of claim 1 wherein the hinge includes an outer side wall and one or more flex regions, the one or more flex regions having a thickness that is less than a thickness of the outer side wall such that the hinge flexes at the flex regions to cause the outer side wall to rotate about the one or more flex regions.

8. The collapsible storage compartment of claim 7 wherein the outer side wall is made of a material having a first durometer and the one or more flex regions are made of the same material as the outer side wall but have a second durometer, the first durometer being different from the second durometer.

9. The collapsible storage compartment of claim 7 wherein the hinge includes at least a first flex region and a second flex region and the outer side wall is positioned between the first flex region and the second flex region.

10. The collapsible storage compartment of claim 9 wherein the outer bin includes an attachment collar, the attachment collar connected to a side of the hinge opposite to the outer base wall, the attachment collar positioned adjacent to the inner bin and connecting the outer bin to the inner bin.

11. The collapsible storage compartment of claim 10 wherein the inner bin includes a saddle portion, the saddle portion positioned along a portion of an outer edge of the inner side wall and configured to receive the attachment collar to connect the outer bin to the inner bin.

12. The collapsible storage compartment of claim 11 wherein:
the saddle portion includes a connecting wall facing the attachment collar, the connecting wall including a plurality of apertures; and
the attachment collar includes a plurality of locking tabs projecting outward from the attachment collar, the plurality of locking tabs configured to be received in the plurality of apertures to connect the outer bin to the inner bin.

13. The collapsible storage compartment of claim 12 wherein the plurality of locking tabs each include a curved projection with a finger, the curved projections of the plurality of locking tabs projecting through the plurality of apertures and the fingers engaging edges of the plurality of apertures to removably connect the outer bin to the inner bin.

14. The collapsible storage compartment of claim 13 wherein the connecting wall and the attachment collar are oriented perpendicular to the inner side wall of the inner bin such that the plurality of locking tabs are positioned perpendicular to the inner side wall when inserted through the plurality of apertures.

15. The collapsible storage compartment of claim 14 wherein the connecting wall is positioned in a connecting plane that is inset from an outer edge of the inner side wall such that the attachment collar is positioned between inner base wall and the outer edge of the inner side wall.

16. The collapsible storage compartment of claim 1 wherein the outer base wall is positioned outside of the cavity when in the deployed position and inside the cavity when in the stowed position.

17. The collapsible storage compartment of claim 1 wherein the outer base wall includes a first edge, a second edge, a third edge and a fourth edge, the hinge connected to the outer base wall along the first edge, the second edge and the third edge, the fourth edge free floating relative to the inner bin to permit access to the cavity when the outer base wall is in the deployed position and in the stowed position.

18. The collapsible storage compartment of claim 1 wherein the inner bin includes a plurality of connection points projecting outward from the inner side wall, the plurality of connection points configured for connecting the inner bin to a support surface oriented parallel to the inner base wall.

19. The collapsible storage compartment of claim 18 wherein the support surface is located on a door trim panel of a vehicle.

20. A collapsible storage compartment for use in a door trim panel of a vehicle, the collapsible storage compartment comprising:
a rigid inner bin including an inner side wall and an inner base wall, the inner side wall connected around a periphery of the inner base wall, the inner side wall including a plurality of connection points and a saddle portion, the plurality of connection points projecting outward from the inner side wall to connect the inner bin to the door trim panel, the saddle portion inset from an outer edge of the inner side wall and extending upward from a bottom of the inner side wall;
an outer bin including a flexible hinge, a rigid outer base wall and an attachment collar, the flexible hinge connected to a first edge, a second edge and a third edge of the outer base wall, a fourth edge of the outer base wall free floating and spaced apart from the inner bin to permit access to an interior of the storage compartment, the flexible hinge connected to and positioned between the rigid outer base wall and the attachment collar, the attachment collar received into the saddle portion to connect the outer bin to the inner bin, the flexible hinge including one or more flex points to permit the hinge to flex inward and toward the inner base wall causing the outer base wall to move toward the inner base wall when the outer base wall is moved from a deployed position to a stowed position; and
wherein the outer base wall has a height that is less than a height of the inner base wall to define an access opening to permit access to a storage volume located between the inner base wall and the outer base wall.

* * * * *